(12) United States Patent
Osa et al.

(10) Patent No.: US 9,454,148 B2
(45) Date of Patent: Sep. 27, 2016

(54) MACHINE CONTROL DEVICE

(71) Applicant: FANUC CORPORATION, Minamitsuru-gun, Yamanashi (JP)

(72) Inventors: Yuuhei Osa, Yamanashi (JP); Kenichi Itou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 368 days.

(21) Appl. No.: 14/104,267

(22) Filed: Dec. 12, 2013

(65) Prior Publication Data

US 2014/0172129 A1 Jun. 19, 2014

(30) Foreign Application Priority Data

Dec. 19, 2012 (JP) ................. 2012-277334

(51) Int. Cl.
*G05B 15/02* (2006.01)
*G05B 19/409* (2006.01)

(52) U.S. Cl.
CPC ... *G05B 19/409* (2013.01); *G05B 2219/33192* (2013.01); *G05B 2219/36159* (2013.01)

(58) Field of Classification Search
CPC ............................................ G05B 15/02
USPC ............................... 700/84; 320/106
See application file for complete search history.

(56) References Cited

U.S. PATENT DOCUMENTS

| 2007/0004168 | A1 | 1/2007 | Zips | |
| 2008/0258679 | A1* | 10/2008 | Manico | H02J 7/025 320/106 |

FOREIGN PATENT DOCUMENTS

| CN | 102799122 A | 11/2012 |
| DE | 10032869 A1 | 1/2002 |
| DE | 10207502 A1 | 9/2002 |
| DE | 10344575 A1 | 4/2005 |
| JP | 06-095772 A | 4/1994 |
| JP | 731066 A | 1/1995 |
| JP | 11134456 A | 5/1999 |
| JP | 2001128375 A | 5/2001 |
| JP | 2006-005978 A | 1/2006 |
| JP | 2011-082653 A | 4/2011 |

OTHER PUBLICATIONS

Decision to Grant a Patent mailed May 13, 2014 corresponds to Japanese patent application No. 2012-277334.
Office Action dated Jun. 25, 2015, corresponding to Chinese patent application No. 201310703801.X.
Office Action in DE Application No. 102013114050.5, mailed Feb. 23, 2016.

* cited by examiner

*Primary Examiner* — Tejal Gami
(74) *Attorney, Agent, or Firm* — Hauptman Ham, LLP

(57) ABSTRACT

A machine control device includes a control unit body and a display operation device that can be separated from the control unit body. The display operation device uses a mechanism which does not use power while the display operation device waits for charging. The display operation device is automatically turned on and off on the basis of the on and off states of the control unit body. A power switch can be provided only in the control unit body. The supply of power from the control device can be automatically turned on and off on the basis of the state of the display operation device. Therefore, the operability and reliability of the machine control device are improved.

10 Claims, 4 Drawing Sheets

MACHINE CONTROL DEVICE

RELATED APPLICATIONS

The present application claims priority to Japanese Application Number 2012-277334, filed Dec. 19, 2012, the disclosure of which is hereby incorporated by reference herein in its entirety.

BACKGROUND OF THE INVENTION

1. Field of the Invention

The present invention relates to a control device for machines, such as working machines, industrial machines, and robots, and more particularly, to a machine control device including a display operation device which is detachable from a machine control device body.

2. Description of the Related Art

In general, a display operation device of a machine control device is attached to a machine control panel. However, when the display operation device is fixed to the machine control panel, the operation position of an operator is also fixed. For example, in the case of a large working machine, the machine needs to be operated in various places by the operator. When the position of the display operation device is also fixed, the operation position is fixed, which results in low operability.

In order to improve the operability, a method has been proposed in which a display operation device 1 can be separated from a machine control unit body 2, the operator of a machine manually operates an operation unit 6, such as a keyboard, and display information signals or operational signals are wirelessly transmitted between the display operation device 1 and the machine control unit body 2 through a display-operation-device-side transceiver 8A and a control-unit-side transceiver 8B, as illustrated in FIG. 5.

In this case, the display operation device 1 includes a charger 5 including a charging circuit and a rechargeable battery. The rechargeable battery of the charger 5 can be charged. When the display operation device 1 is not operated or when it can be operated in the vicinity of the machine control unit body 2, a connector 7 which is provided in the display operation device 1 is connected to the machine control unit body 2 by a connection cable 4 and a power supply 3 connected to the machine control unit body 2 is connected to the charger 5 of the display operation device 1 by wire.

When the connection cable 4 is disconnected from the display operation device 1 and the display operation device 1 is separated from the machine control unit body 2 and is then operated, the display operation device 1 is operated by power from the charged battery and wirelessly transmits and receives display information or operational information. The machine control unit body 2 includes a machine control circuit 9 having the function of a machine control device. The machine control circuit 9 is driven by power supplied from a power supply. The power consumed by the display operation device 1 includes power for a display operation and a wireless communication operation of the display operation device 1.

Japanese Patent Application Laid-Open No. 6-95772 discloses a technique in which, in an electronic apparatus which includes a main body and a slave machine, an electrode of the main body is connected to an electrode of the slave machine by a connector and power is supplied. In a case in which the electronic apparatus is used in a bad environment in which the air is filled with a cutting fluid mist, when the connection cable is disconnected, the connector needs to have a waterproof structure, such as a cover or a cap with a packing. However, even when the waterproof structure is used, operability is reduced due to frequent detachment of the connection cable. In particular, in the structure using the cover, there is a concern that the failure rate of a movable part will increase and reliability will be reduced. In the structure using the cap, there is a concern that the cap will be lost. Therefore, a spare cap is needed. Even when measures to the cutting fluid are taken, it is difficult to provide complete solutions to the cutting fluid mist which fills up the air. A very small amount of infiltrated cutting fluid rusts the connector. For the disconnected connection cable, a connector portion needs to be covered such that the cutting fluid is not infiltrated into the connector portion, the entire cable needs to be put into a bag, or the cable needs to be kept in the place where it is not affected by the cutting fluid.

Japanese Patent Application Laid-Open No. 2011-82653 and Japanese Patent Application Laid-Open No. 2006-5978 disclose a technique which wirelessly supplies power to an apparatus. In this technique, since power is wirelessly supplied, a power supply connector is not needed. Therefore, a connection portion does not need to be proof against, for example, a cutting fluid. However, in the technique disclosed in Japanese Patent Application Laid-Open No. 2011-82653, the control unit controls the turning on and off of a power supply unit that wirelessly supplies power. Therefore, there is a concern that a control operation will be complicated. In the technique disclosed in Japanese Patent Application Laid-Open No. 2006-5978, the power supply unit which wirelessly supplies power operates constantly. Therefore, the power supply unit continuously supplies power even at the distance at which the supply of power is not available. As a result, there is a concern that efficiency will be reduced.

SUMMARY OF THE INVENTION

An object of the invention is to provide a machine control device capable of achieving the following.

(1) The machine control device is provided with a mechanism which does not use power when a display operation device waits for charging. Therefore, it is possible to reduce the power consumption of a battery and increase the lifetime of the battery.

(2) The display operation device is automatically turned on and off on the basis of the power supply state of a control device body. Therefore, a power switch can be provided only in the control device body.

(3) The supply of power from the control device body is automatically turned on and off on the basis of the state of the display operation device. Therefore, operability and reliability are improved.

A machine control device according to an aspect of the invention includes a control unit body and a display operation device that can be separated from the control unit body. The control unit body includes a wireless power transmission circuit, a light/magnetism generation unit that generates light or magnetism when the control unit body is turned on, and a control-unit-side wireless communication circuit. Meanwhile, the display operation device includes a display unit comprising a display, an operation unit comprising a keyboard, a wireless power receiving circuit, a charging circuit, a battery that is charged by the charging circuit, a switch that turns on the display operation device in response to the light or magnetism generated by the light/magnetism generation unit of the control unit body, a display operation device on/off state holding circuit that holds the on state of the switch until power is turned off, and a display-operation-device-side wireless communication circuit. Data is wirelessly transmitted and received between the control-unit-side wireless communication circuit and the display-operation-device-side wireless communication circuit. The display operation device on/off state holding circuit which is turned on by a signal included in the data is turned off to turn off the display operation device. The wireless power receiving circuit of the display operation device receives power which is wirelessly supplied from the wireless power transmission circuit of the control unit body.

The "machine" is not limited to a working machine, but includes various types of machines, such as industrial machines and robots. In addition, the "light/magnetism generation unit" corresponds to the coil according to the embodiment. However, any means may be used as the "light/magnetism generation unit" as long as it generates at least one of light and magnetism. The operation means of the display operation unit includes various operation means, such as a keyboard and a touch panel.

According to the machine control device, since the mechanism which does not use power when the display operation unit waits for charging is provided, it is possible to reduce the power consumption of the battery and increase the lifetime of the battery. The control device body can turn on and off the display operation device on the basis of the power supply state of the control device body. Therefore, it is not necessary to provide a power switch in the display operation device. Even in a bad environment, it is not necessary to provide a waterproof structure in a contact portion of the switch. In addition, it is possible to automatically turn on and off the supply of power from the control device body on the basis of the state of the display operation device.

The control unit body may further include a detection unit that detects whether the display operation device is installed at a position where it can be charged and a power transmission enabling unit that enables the wireless power transmission circuit to transmit power when the detection unit detects that the display operation device is installed at a position where it can be charged. The display operation device may further include a metal piece, and the detection unit of the control unit body may be a proximity switch that detects whether the metal piece is disposed at a predetermined position.

In the machine control device according to the above-mentioned aspect, it is detected whether the display operation device is installed at the position where it can be charged and the wireless power transmission circuit can transmit power on the basis of the detection result. Therefore, only when the display operation device is installed at the position where it can receive power, the wireless power transmission circuit can transmit power. It is possible to prevent unnecessary power transmission. In addition, it is possible to automatically start and stop the transmission of power from the wireless power transmission circuit on the basis of the position of the display operation device. Therefore, it is possible to reduce the amount of control of the machine control device.

The display operation device may further include a charge amount monitoring circuit that monitors the remaining power of the battery and a remaining power notification unit that notifies the control unit body of the remaining power of the battery when the remaining power of the battery is equal to or less than a predetermined value. The control unit body may supply power to the display operation device when receiving the notice indicating the remaining power of the battery from the remaining power notification unit. In addition, the display operation device may further include a coil that is connected to the charge amount monitoring circuit and a metal piece whose position is changed by a current which flows to the coil. The control unit body may further include a proximity switch that detects whether the metal piece is disposed at a predetermined position. When the proximity switch detects the metal piece, the control unit body may supply power to the display operation device.

In the machine control device according to the above-mentioned aspect, since the display operation device includes the charge amount monitoring circuit that monitors the remaining power of the battery and the notification means that notifies the control unit body of the remaining power of the battery, it is possible to automatically perform charging on the basis of the charging state of the display operation device. Only when charging is needed, the control unit body supplies power. Therefore, it is possible to prevent unnecessary power supply. When the control device body starts, the display operation device can maintain an operable state. Therefore, it is possible to improve operability.

According to the machine control device of the above-mentioned aspect of the invention, it is possible to automatically charge the display operation device only by installing the display operation device at a predetermined position. In addition, since an electrical contact is not needed, it is not necessary to provide, in a connection portion, a protection structure using a cover or a cap against, for example, a cutting fluid. In addition, since a cable is not needed, it is not necessary to consider the cable. Since problems relating to a waterproof structure for the periphery of the connector and resistance to the cutting fluid do not occur, it is possible to improve operability and reliability and reduce costs.

In addition, it is not necessary to provide a power switch in the display operation device and it can be checked whether the display operation device is disposed at a predetermined position in a non-contact manner. Therefore, the possibility of the cutting fluid flowing into the display operation device from, for example, a switch or a key of the display operation device is reduced and reliability is improved. In addition, no power is consumed when the battery of the display operation device waits for charging and the number of charging operations can be reduced. Therefore, the lifetime of the battery increases and the number of replacements of the battery is reduced. As a result, maintenance is improved.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE PREFERRED EMBODIMENTS

Figure 1:
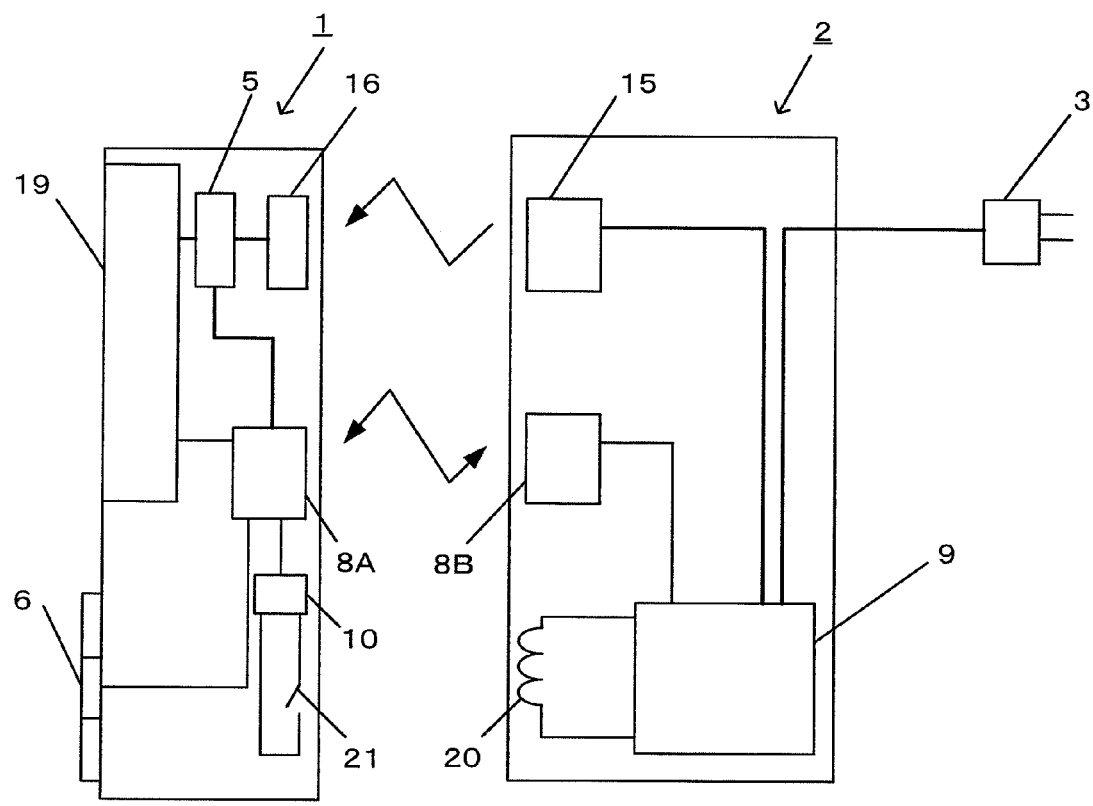
FIG. 1 is a diagram illustrating a machine control device according to a first embodiment of the invention.

First, a machine control device according to a first embodiment of the invention will be described with reference to FIG. 1.

The machine control device includes a display operation device 1 and a machine control unit body 2. A display unit 19 which is a liquid crystal display for displaying the state of the machine control device to an operator who operates the machine and an operation unit 6 which is, for example, a keyboard used by the operator to operate and control the machine control device are provided on the outer surface of the display operation device 1. In addition, a power receiving circuit 16 which receives power that is wirelessly supplied from a power transmission circuit 15 of the machine control unit body 2, which will be described below, a charger 5 which is charged with the power received by the power receiving circuit 16, a display-operation-device-side transceiver 8A which performs information communication with a control-unit-side transceiver 8B of the machine control unit body 2, which will be described below, and a switch 21 which turns on and off the display operation device 1 are provided in the display operation device 1.

A power transmission circuit 15 which transmits power to the power receiving circuit 16 of the display operation device 1, the control-unit-side transceiver 8B which performs information communication with the display-operation-device-side transceiver 8A of the display operation device 1, a machine control circuit 9, and a coil 20 are provided in the machine control unit body 2. The machine control unit body 2 is connected to an external power supply 3 and is supplied with power. The machine control circuit 9 is provided with software. For example, when the machine is a numerical controller, the machine control circuit 9 includes, as the software, servo control software and sequence control software which serves as a servo control circuit for controlling a servo motor and as a sequence control circuit for sequence control.

Next, the operation of the machine control device illustrated in FIG. 1 will be described.

A signal indicating the state of the machine control unit body 2 or a signal for controlling the display operation device 1 is transmitted as a radio signal, such as a radio wave, from the control-unit-side transceiver 8B to the display-operation-device-side transceiver 8A. To the contrary, a signal which is input by the operator through the display operation device 1 is transmitted as a radio signal, such as a radio wave, from the display-operation-device-side transceiver 8A to the control-unit-side transceiver 8B. The machine control unit body 2 is controlled on the basis of the transmitted operation signal.

Power is wirelessly supplied from the machine control unit body 2 to the display operation device 1 by electromagnetic coupling. Examples of the electromagnetic coupling include an electromagnetic induction type, a magnetic resonance type, and an electrolytic coupling type, by which power is wirelessly supplied from the power transmission circuit 15 of the machine control unit body 2 to the power receiving circuit 16 of the display operation device 1. The charger 5 is charged by the supplied power. The distance at which the signal can be transmitted and received between the display-operation-device-side transceiver 8A and the control-unit-side transceiver 8B is longer than the distance at which power can be supplied by wireless power transmission. Therefore, even when the efficiency of power supply is reduced due to an increase in the distance between the machine control unit body 2 and the display operation device 1, the power charged to the charger 5 of the display operation device 1 can be used to operate the operation unit 6 of the display operation device 1 or to transmit and receive signals to and from the machine control unit body 2.

According to this, the display operation device 1 which is confirmed to be provided at the position where it can be supplied with power from the power transmission circuit 15 of the machine control unit body 2 can be supplied with power. When the display operation device 1 is operated at the position that is away from the machine control unit body 2, the display operation device 1 can be used at the position that is away from the original installation place.

The coil 20 is provided in the machine control unit body 2. A current flows to the coil 20 when the machine control unit body 2 is turned on and a magnetic field is generated. The switch 21 which is operated by the magnetic field generated by the coil 20 of the machine control unit body 2 is provided in the display operation device 1.

First, when the machine control unit body 2 is changed from an off state to an on state, a current flows from the machine control circuit 9 to the coil 20 and the magnetic field is generated. The switch 21 in the display operation device 1 is turned on by the generated magnetic field. Then, the display operation device 1 is turned on and starts its operation. A display operation device on/off state holding circuit 10 which holds the on state of the switch until power is turned off is provided between the switch 21 and the display-operation-device-side transceiver 8A. The display-operation-device-side transceiver 8A of the display operation device 1 is configured such that, after the switch 21 is turned on once, the display operation device on/off state holding circuit 10 holds the on state of the switch 21 in the circuit until power is turned off. Therefore, after the switch 21 is turned on, the display operation device 1 is not turned off even when the display operation device 1 is carried and the distance between the coil 20 and the switch 21 increases.

When the machine control unit body 2 is changed from the on state to the off state, a signal for turning off the display operation device 1 is transmitted from the control-unit-side transceiver 8B of the machine control unit body 2 to the display-operation-device-side transceiver 8A. The switch 21 of the display operation device 1 is turned on and off by the electromagnetic energy of the machine control unit body 2. Therefore, it is not necessary to provide a button for turning on and off the switch 21 in the display operation device 1. In addition, the switch 21 does not need to have a power supply.

In the example illustrated in FIG. 1, the coil 20 is used as a means for turning on the switch 21 in the display operation device 1. However, an optical method may be used to turn on and off the switch 21. For example, a light emitting diode is used instead of the coil 20 and a zero-power photodetection IC which can detect light with a power of 0 is used instead of the switch 21.

Next, a machine control device according to a second embodiment of the invention will be described with reference to FIG. 2.

The second embodiment differs from the first embodiment in that the display operation device 1 further includes a metal piece 30 and the machine control unit body 2 further includes a proximity switch 22.

The proximity switch 22 is provided at the position where it detects the metal piece 30 in the display operation device 1 and is turned on when the display operation device 1 is disposed at a predetermined position with respect to the machine control unit body 2. A machine control circuit 9 monitors the on and off states of the proximity switch 22. Therefore, it is possible to determine whether the display operation device 1 is disposed at a predetermined position where it can be supplied with power.

The proximity switch 22 in the machine control unit body 2 is turned on and off to turn on and off the transmission of power from a power transmission circuit 15 of the machine control unit body 2 to the display operation device 1. When the display operation device 1 is disposed at the predetermined position where it can be supplied with power, the proximity switch 22 in the machine control unit body 2 is turned on and power is transmitted from the power transmission circuit 15. Therefore, it is possible to prevent unnecessary power transmission and reduce power consumption.

Next, a machine control device according to a third embodiment of the invention will be described with reference to FIG. 3.

The third embodiment differs from the first embodiment in that the display operation device 1 includes a charge amount monitoring circuit 40 that constantly monitors the amount of charge of a rechargeable battery of the charger 5, and a charging state transmission mechanism 41 that transmits the state of charge to the machine control unit body 2 and the machine control unit body 2 includes a charging state detection mechanism 42 that detects charging state transmission information from the charging state transmission mechanism 41 in the display operation device 1. The third embodiment differs from the second embodiment in that the charging state detection mechanism 42 turns on and off the power transmission circuit 15, independently of turning on and off of the machine control circuit 9.

Figure 3:
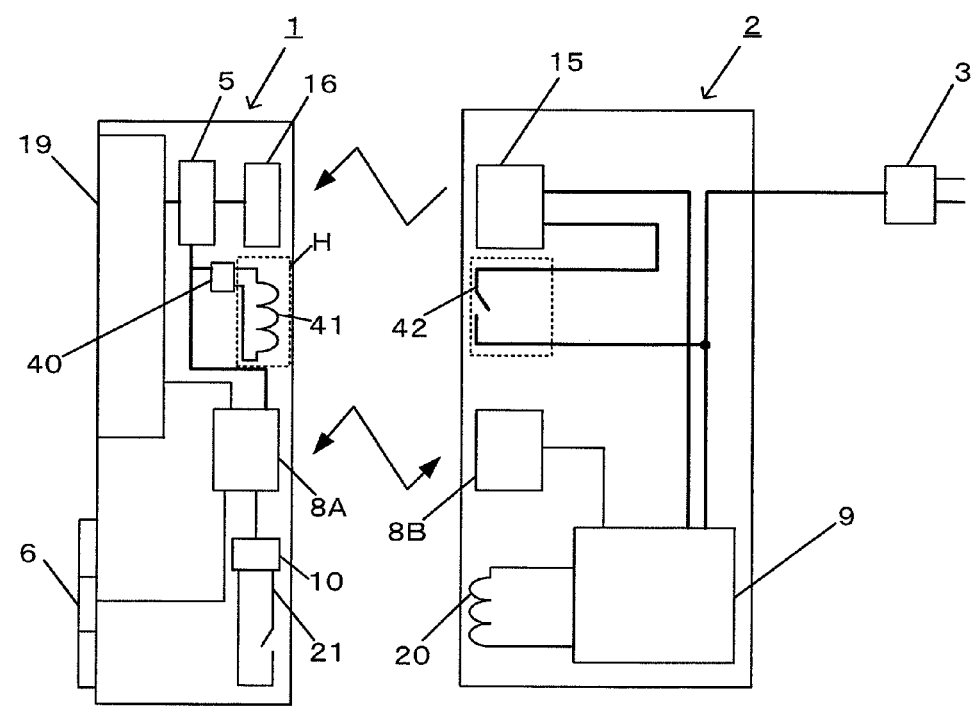
FIG. 3 is a diagram illustrating a machine control device according to a third embodiment of the invention.
Figure 4:
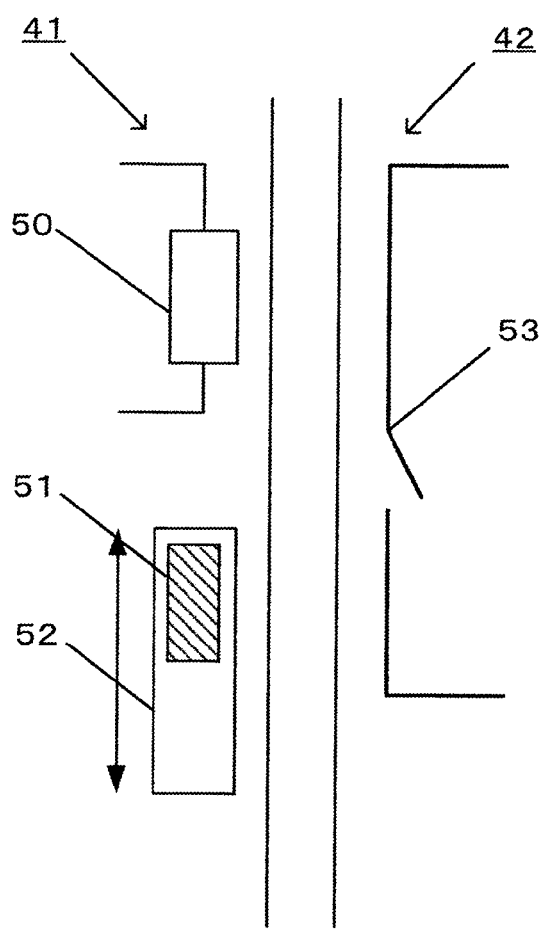
FIG. 4 is an enlarged view illustrating a portion surrounded by a dotted line H in FIG. 3.
Figure 5:
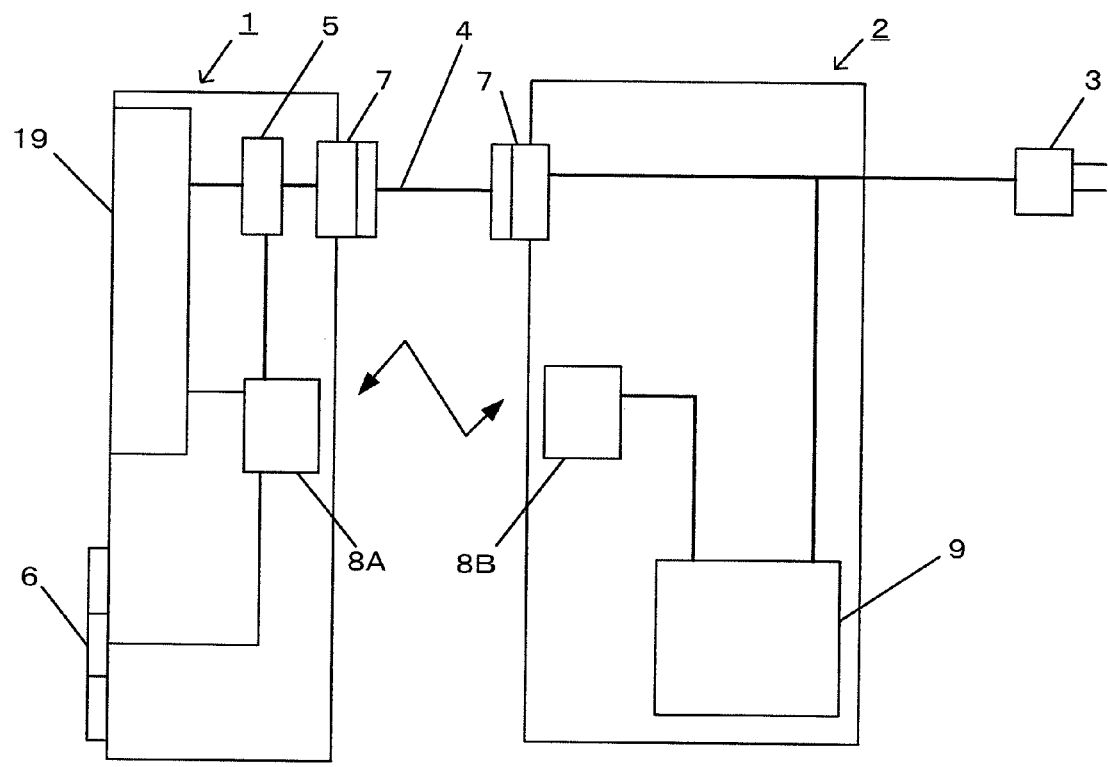
FIG. 5 is a diagram illustrating an example of a machine control device according to the related art.

As illustrated in the enlarged view of FIG. 4, the charging state transmission mechanism 41 in the display operation device 1 illustrated in FIG. 3 includes a coil 50 and a cylinder 52 having a metal piece 51 provided therein. Meanwhile, the charging state detection mechanism 42 in the machine control unit body 2 includes a proximity switch 53.

In the charging state transmission mechanism 41 of the display operation device 1, the metal piece 51 is moved up and down in the cylinder 52 by the relationship between the magnetic field generated by the coil 50 and gravity. That is, when the magnetic field is generated by the coil 50, the metal piece 51 is attracted to the coil 50. When the magnetic field is not generated, the metal piece 51 is separated from the coil 50 by gravity. Therefore, when the amount of charge of the rechargeable battery of the charger 5 is greater than a predetermined value, a current flows to the coil 50 and the metal piece 51 is attracted to the coil 50. On the other hand, when the amount of charge is less than the predetermined value, no current flows to the coil 50 and the metal piece 51 is separated from the coil 50 by gravity.

The charging state detection mechanism 42 detects the position of the metal piece 51 in the cylinder 52 using the proximity switch 53. In this embodiment, power from the power supply 3 can be directly supplied to the power transmission circuit 15 through the proximity switch 53, without passing through the machine control circuit 9. Therefore, when the proximity switch 53 is turned on, power is directly supplied from the power supply 3 to the power transmission circuit 15. As a result, even when the machine control circuit 9 is turned off, it is possible to transmit power to the display operation device 1.

As described above, the position of the metal piece 51 in the charging state transmission mechanism 41 of the display operation device 1 varies depending on the amount of charge of the rechargeable battery of the charger 5. In this embodiment, the proximity switch 53 in the charging state detection mechanism 42 of the machine control unit body 2 is arranged at the position where, when the amount of charge of the rechargeable battery of the charger 5 in the display operation device 1 is less than a predetermined value and the metal piece 51 is separated from the coil 50 by gravity, it detects the metal piece at the separated position and is turned on. The proximity switch 53 detects the state in which the amount of charge of the rechargeable battery of the charger 5 in the display operation device 1 is less than the predetermined value and charging is needed, and power is supplied from the power transmission circuit 15. Therefore, even when the machine control circuit 9 is turned off, the amount of charge of the charger 5 in the display operation device 1 can be maintained at a predetermined value or more. In addition, when the machine control unit body 2 is turned on, the display operation device 1 can be maintained in a usable state.

Figure 2:
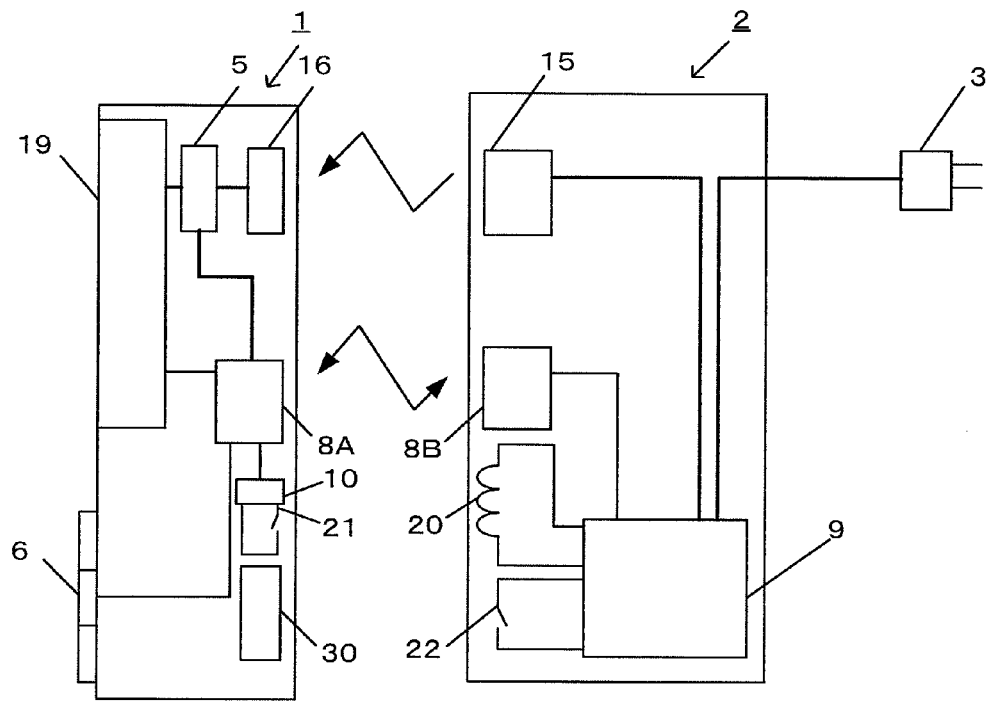
FIG. 2 is a diagram illustrating a machine control device according to a second embodiment of the invention.

The structure according to this embodiment in which the charging state transmission mechanism 41 transmits the state of charge of the charger 5 in the display operation device 1 to the charging state detection mechanism 42 of the machine control unit body 2 can be applied to the mechanism illustrated in FIG. 2 (second embodiment) which transmits, to the machine control unit body 2, information indicating that the display operation device 1 is disposed at a predetermined position with respect to the machine control unit body to which an electric power can be supplied.

In the machine control devices according to the first to third embodiments of the invention, the switch for turning on and off the display operation device 1 is not provided in the display operation device 1, but only the machine control unit body 2 turns on and off the display operation device 1. However, for example, an external switch which turns on and off the display operation device 1 may be provided in the display operation device 1 such that the display operation device 1 is turned on and off even at the position where the display operation device 1 is away from the machine control unit body 2. However, in this case, the display operation device 1 needs to be waterproof.

In the machine control devices according to the first to third embodiments of the invention, the liquid crystal display is used as the display unit 19. However, the display unit 19 is not limited thereto, but any method can be used as long as it can display the operational state to the operator. For example, an EL display or a lamp may be used as the display unit 19. In this embodiment, a keyboard is used as the operation unit 6. However, the operation unit 6 is not limited thereto, but other operation means, such as a touch panel and buttons, may be used.

In the machine control devices according to the first to third embodiments of the invention, the metal piece 30 or the metal piece 51 is detected by the coil 20 or the coil 50. However, the detection target is not necessarily limited to the metal piece, but magnetic bodies, which are attracted by magnetism, other than the metal piece may be used.

In the third embodiment, as illustrated in FIG. 4, the cylinder 52 is provided in the display operation device 1 (or in the charging state transmission mechanism 41) such that the axial direction thereof is aligned with the vertical direction. When a current flows to the coil 50 in the display operation device 1, the metal piece 51 is attracted against gravity. On the other hand, when no current flows to the coil 50, the metal piece 51 falls by gravity. However, the cylinder 52 is not necessarily limited to this structure. For example, the cylinder 52 may be provided such that the axial direction thereof is inclined at a predetermined angle with reference to the vertical direction. In addition, an elastic member, such as a spring or rubber, may be attached to the metal piece 51 and the position of the metal piece 51 may be changed by the relationship between the magnetic force of the coil and the elastic force of the elastic member.

The invention claimed is:

1. A machine control device, comprising:
    a control unit body; and
    a display operation device separated from the control unit body,
    wherein
    the control unit body includes:
        a wireless power transmission circuit;
        a light/magnetism generation unit configured to generate light or magnetism when the control unit body is turned on; and
        a control-unit-side wireless communication circuit,
    the display operation device includes:
        a display unit including a display;
        an operation unit including a keyboard;
        a wireless power receiving circuit;
        a charging circuit;
        a battery configured to be charged by the charging circuit;
        a switch configured to turn on the display operation device in response to the light or magnetism generated by the light/magnetism generation unit of the control unit body;
        a display operation device on/off state holding circuit configured to hold the on state of the switch until power is turned off; and
        a display-operation-device-side wireless communication circuit,
    the control-unit-side wireless communication circuit and the display-operation-device-side wireless communication circuit are configured to wirelessly transmit and receive data with each other,
    the display operation device on/off state holding circuit is configured to be
        turned on by a signal included in the data, and
        turned off to turn off the display operation device, and
    the wireless power receiving circuit of the display operation device is configured to receive the power wirelessly supplied from the wireless power transmission circuit of the control unit body.

2. The machine control device according to claim 1, wherein
    the control unit body further includes:
        a detection unit configured to detect whether the display operation device is installed at a position where the battery of the display operation device is chargeable; and
        a power transmission enabling unit configured to enable the wireless power transmission circuit to transmit the power when the detection unit detects that the display operation device is installed at the position where the battery of the display operation device is chargeable.

3. The machine control device according to claim 2, wherein
    the display operation device further includes a metal piece, and
    the detection unit of the control unit body comprises a proximity switch configured to detect whether the metal piece is disposed at a predetermined position corresponding to the position where the battery of the display operation device is chargeable.

4. The machine control device according to claim 1, wherein
    the display operation device further includes:
        a charge amount monitoring circuit configured to monitor the remaining power of the battery; and
        a remaining power notification unit configured to notify the control unit body of the remaining power of the battery when the remaining power of the battery is equal to or less than a predetermined value, and
    the control unit body is configured to supply the power to the display operation device when receiving the notice indicating the remaining power of the battery from the remaining power notification unit.

5. The machine control device according to claim 1, wherein
    the display operation device further includes:
        a coil connected to the charge amount monitoring circuit, and
        a metal piece movable by a current flowing in the coil,
    the control unit body further includes a proximity switch configured to detect whether the metal piece is disposed at a predetermined position, and
    when the proximity switch detects the metal piece at the predetermined position, the control unit body is configured to supply the power to the display operation device.

6. The machine control device according to claim 1, wherein the data transmitted from the control-unit-side wireless communication circuit to the display-operation-device-side wireless communication circuit includes a signal indicating a state of the control unit body.

7. The machine control device according to claim 1, wherein the data transmitted from the display-operation-device-side wireless communication circuit to the control-unit-side wireless communication circuit includes a signal input by an operator through the display operation device to control the control unit body.

8. The machine control device according to claim 1, wherein
    the light/magnetism generation unit comprises a coil, and
    the switch is operable by a magnetic field generated by the coil.

9. The machine control device according to claim 1, wherein
    the light/magnetism generation unit comprises a light emitting diode, and
    the switch comprises a zero-power photodetection IC configured to detect the light generated by the light emitting diode.

10. The machine control device according to claim 1, wherein the control unit body further comprises a control circuit configured as a servo control circuit for controlling a servo motor.

* * * * *